United States Patent

Meyer et al.

[15] 3,645,156
[45] Feb. 29, 1972

[54] AUTOMATIC WIRE NICK DETECTOR FOR ELECTRIC WIRE CUT AND STRIP MACHINES

[72] Inventors: Heinrich F. Meyer, Liverpool; Edward L. Minchow, Syracuse, both of N.Y.

[73] Assignee: General Electric Company

[22] Filed: June 11, 1970

[21] Appl. No.: 45,297

[52] U.S. Cl. .......................................83/9, 81/9.51, 83/62, 83/522, 83/924
[51] Int. Cl. .........................................................H02g 1/12
[58] Field of Search......................83/9, 8, 62, 522, 622, 924; 81/9.51

[56] References Cited

UNITED STATES PATENTS

| | | | |
|---|---|---|---|
| 2,497,112 | 2/1950 | Andren | 81/9.51 |
| 2,671,363 | 3/1954 | Wells | 81/9.51 |
| 3,208,271 | 9/1965 | Thompson | 81/9.51 X |

*Primary Examiner*—James M. Meister
*Attorney*—Carl W. Baker, Richard V. Lang, Frank L. Neuhauser, Oscar B. Waddell and Joseph B. Forman

[57] ABSTRACT

An automatic wire nick detector for electrical lead wire cut and strip machines, for detecting any potentially damaging contact between the lead wire stock and one of the insulation stripping blades used for severing or scoring the insulation of the wire preparatory to its stripping. For sensing and indicating such contacts, each of the stripping blades is connected in series circuit relation with an indicating or control device, with the wire cutter blades and, through those blades, with the length of wire stock which extends between them and the insulation stripping blades, so that in the event of any stripping blades contact with the wire the sensing circuit is completed and the indicating or control device is energized thereby. In this way reliable indication of nicking or other potential stripping blade damage to electrical leads as produced by wire cut and strip machines may be afforded automatically, with only very minor changes in the machine structure and very simple associated electrical circuitry.

3 Claims, 6 Drawing Figures

PATENTED FEB 29 1972

INVENTORS:
HEINRICH F. MEYER,
EDWARD L. MINCHOW,

BY C. W. Baker

THEIR ATTORNEY.

3,645,156

AUTOMATIC WIRE NICK DETECTOR FOR ELECTRIC WIRE CUT AND STRIP MACHINES

BACKGROUND OF THE INVENTION

The present invention relates to apparatus for preparing electrical connectors and leads from wire stock by cutting the stock to desired lengths and stripping insulation from the wire ends adjacent the cuts. More specifically this invention relates to apparatus for detecting potentially damaging contact between the wire insulation stripping mechanism and the wire, so as to detect the presence of any such contact and indicate to the operator that a potentially defective lead is being outputted.

The nick detector of this invention has application to any of the many wire cut and strip machines which employ opposed reciprocating cutter heads each carrying a wire cutter blade and, spaced on either side thereof, insulation stripping blades which sever or score the wire insulation preparatory to its being stripped from the lengths of wire lying between the cutting and stripping blades. Typically these machines comprise also a belt or wheel drive mechanism for transporting or feeding the wire stock into the cut and strip mechanism, means for ejecting the cut and stripped leads, and means for integrating the control of the wire feed, cut and strip, and ejection mechanisms. Among the prior machines of this general kind to which the present invention has application is that disclosed and claimed in copending application Ser. No. 861,970, filed Sept. 29, 1969 in the name of Heinrich F. Meyer, one of the inventors in the instant case.

Since the purpose and function of the insulation stripping blades in these known machines requires them to cut at least partially through the wire insulation, a possibility always exists that one or both of the stripping blades may contact the wire as the blades come together at the end of their inward stroke, resulting in a nick or cut into the wire itself. Such cuts and nicks if undetected may compromise the integrity of the equipment in which the lead ultimately is used, because the resulting reduction in cross-sectional area of the wire mechanically weakens the wire particularly with respect to fatigue strength, and also because it increases the current density at that point and so may cause localized overheating. Direct visual inspection of finished leads individually for cuts and nicks is tedious and time consuming, particularly since the wire insulation adjacent the stripped end may creep slightly to cover the nick or cut thus concealing it from view and requiring the inspector to push back the insulation in order to insure exposure of any injury to the underlying wire.

The present invention is directed to this problem of damage detection in wire cut and strip machines and has as its primary objective the provision of means in such machines for detecting automatically any potentially damaging contact between the insulation stripping blades and the wire, and for indicating any such contact to the operator or taking corrective action through the machine control system as preferred. In accordance with the invention, the addition of such automatic nick detection and indication function to wire cut and strip machines of present design entails only minor modification of machine structure and the associated electrical circuitry required is relatively simple and low cost in character.

SUMMARY OF THE INVENTION

In brief, the automatic nick detector of this invention senses any electrical contact between the insulation stripping blades and the wire, and whenever any such contact occurs it completes an electrical circuit which energizes an indication or control device. This circuit includes the one of the insulation stripping blades which has made contact with the wire, the length of wire which extends between that insulation stripping blade and the wire cutter blades, and the wire cutter blades themselves, these blades being in mechanical and electrical contact with the cut ends of the wire during the inward stroking of the insulation stripping blades. Operation of the detection circuit in this way requires that the insulation stripping blades and wire cutter blades, which normally are mounted to a common carrier member or cutter head, be electrically insulated from each other. Such insulated blade mounting requires only minor changes in structure of the standard cutter head assemblies widely used in conventional wire cut and strip machines, however, and the components of the associated electrical circuitry are correspondingly simple and inexpensive.

BRIEF DESCRIPTION OF THE DRAWINGS

The foregoing and other objects, features and advantages of the invention will become more fully apparent and the invention further understood by reference to the following detailed description when read in conjunction with the accompanying drawings, wherein.

DESCRIPTION OF THE PREFERRED EMBODIMENT

Figure 1:
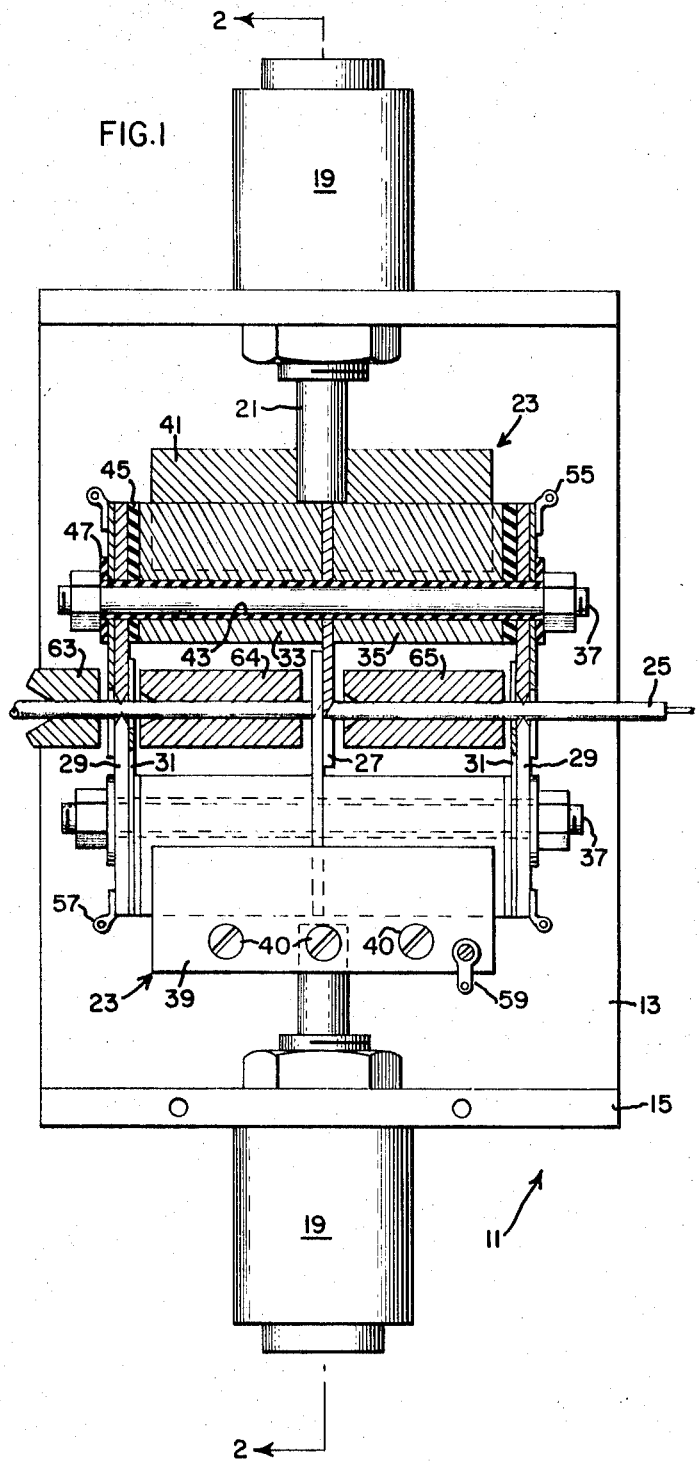
FIG. 1 is a part sectional view of wire cutting and stripping apparatus adapted for automatic nick detection in accordance with the invention.

With continued reference to the drawings, wherein like reference numerals have been used throughout to designate like elements, FIG. 1 illustrates a wire and insulation cutter head assembly and carriage, adapted for nick detection in accordance with the invention. The associated wire feed and transport mechanism, and the mount and actuator mechanisms for effecting translatory movements of the cutter head carriage with respect to the cut and uncut lengths of wire as necessary to strip the insulation from the adjacent ends thereof, are not illustrated as these may take any of the various configurations common in conventional wire cut and strip machines. The aforesaid Meyer patent application, for example, illustrates and describes in detail suitable mechanism for accomplishing wire feed, cut, strip and ejection operations in a wire cut and strip machine employing a cutter head assembly similar to that shown in FIG. 1.

Figure 2:
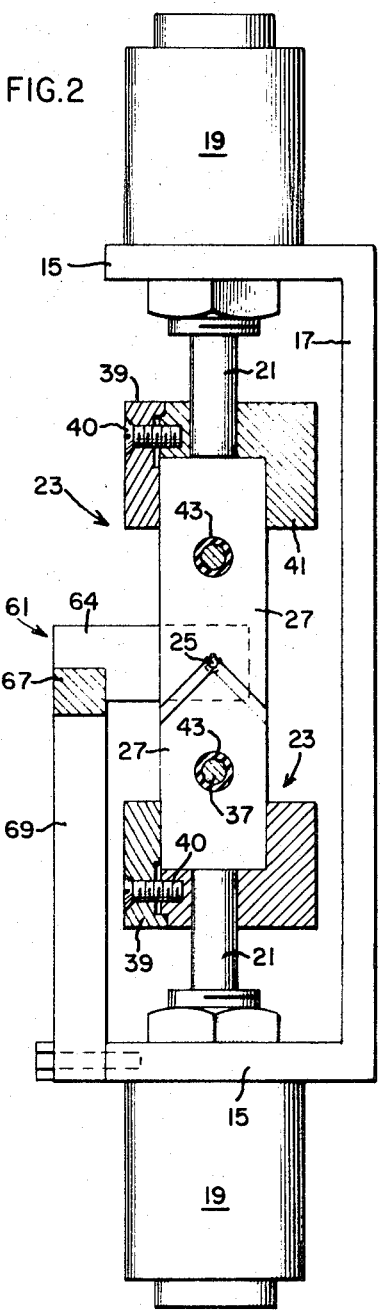
FIG. 2 is a part sectional view taken along the line 2—2 in FIG. 1.

The cutter head assembly designated generally by reference numeral 11 in FIG. 1 is mounted to a carriage member 13 which as best seen in FIG. 2 may be of U shape, comprising two side frame members 15 joined by a base member 17. A linear actuator 19 is mounted to each of the side frames 15, these actuators preferably being of pneumatic type and being operable to stroke their respective output rods 21 through distances such as to translate the two cutter heads 23 mounted thereto into and out of cutting relation with each other. The two cutter heads comprise cutter blade assemblies which may be identical to each other but which are mounted in reversed relationship so as to place their respective blades in the complementary interrelation shown, when the cutter heads are stroked together into engagement with the wire stock indicated at 25.

Each of the cutter heads 23 comprises a wire cutter blade 27, two insulation stripping blades 29 each spaced from the wire cutter blade a distance equal to the desired length of stripped lead, and two guide blades 31 each disposed in juxtaposed relation with one of the insulation stripping blades 29 as shown. The several blades of each cutter head have spacer members 33 and 35 interposed between them and are held in assembled relation by a bolt 37 extending through the entire head assembly. Each assembly thus constituted is detachably fixed by a clamp member 39 bolted as at 40 to a mounting block 41 which is in turn fixed to one of the actuator output rods 21 as by a set screw (not shown).

Electrical insulation is provided between the wire guide and insulation stripping blade members and the remainder of the associated cutter head structure, by an insulating sleeve as at 43 enclosing the bolt 37, and by insulating washers as at 45 and 47 on either side of the wire guide and insulation stripping blade pair. To enable electrical connection to the guide, stripping and cutter blades for nick detection as hereinafter described, suitable terminal members may be provided as shown at 55 and 57 for the wire guide and insulation stripping blade members and as shown at 59 for the wire cutter blades.

Before describing the electrical circuitry to which these terminals provide connection, and to complete the description of the mechanical elements illustrated in FIGS. 1 and 2, a stationary wire guide member may be provided for assisting in centering the wire stock at each of the three stations at which it is contacted by the blade assembly. Guide member 61 comprises three aligned segments 63, 64 and 65 all of which may be carried by a common support member 67 which is in turn mounted as by a bracket 69 to one of the carriage frame members 15 as shown. These guides serve simply to straighten and center the wire in the regions in which the cutter blades operate, and in the performance of this function they are assisted by the guide blades 31 paired with the insulation stripping blades 29.

Figure 3:
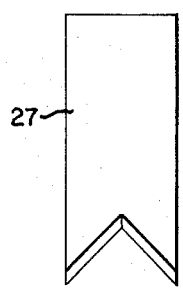
FIGS. 3, 4 and 5 are plan views of a wire cutter blade, guide blade, and insulation stripping blade, respectively, suitable for use in the apparatus of FIG. 1.
Figure 4:
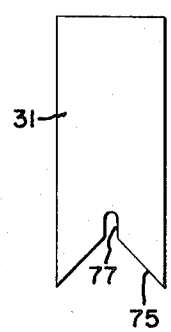
Figure 5:
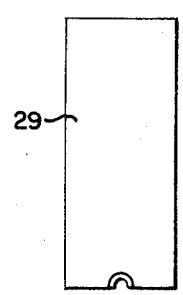

As best seen in FIGS. 3, 4 and 5, the wire cutter blades 27 of FIG. 3 and insulation stripping blades 29 of FIG. 5 are of a standard configuration widely used in commercial wire cut and strip machines, and they may be employed without modification in machines embodying automatic nick detection in accordance with the present invention. The wire guide blades 31 of FIG. 4 afford a very precise wire centering function, which is accomplished by providing them with a bevel edged wire entry portion 75 converging to a narrow slot 77 just wide enough to freely receive the wire. When the two opposing guide blades 31 are stroked together, the wire if initially off center to one side will be contacted by the beveled surface 75 of the guide blade on that side and will be forced thereby toward the center; then as the blades 31 reach fully meshed position the wire will be held centered by its engagement within the slots 77. Such precise centering of the wire minimizes the possibility of contact between it and the insulation stripping blades 29 as will be further explained hereinafter.

Figure 6:
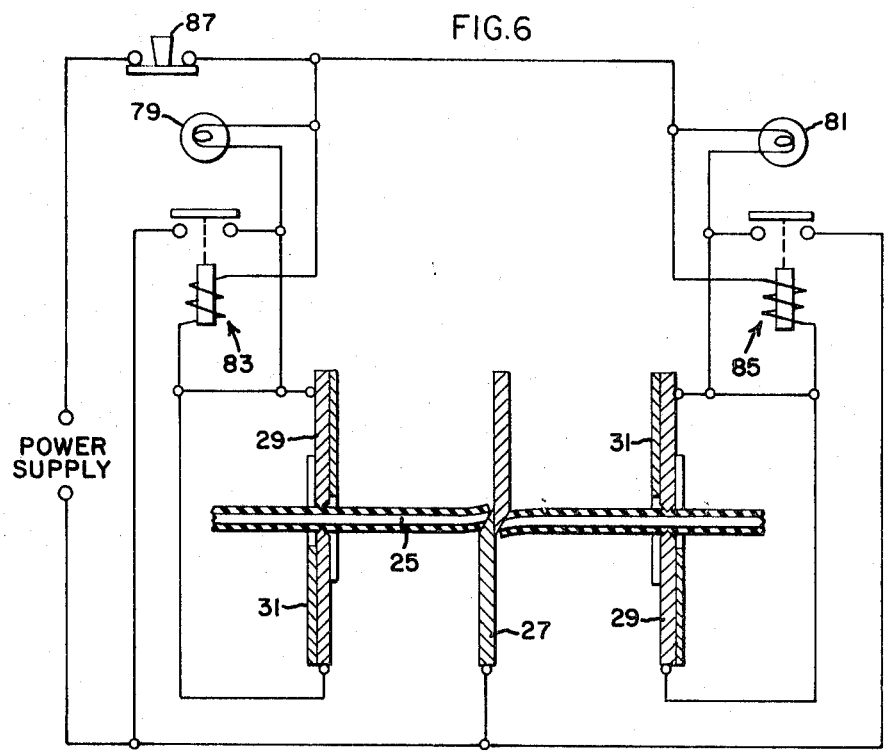
FIG. 6 is a schematic of an electrical circuit providing automatic nick detection with the apparatus of FIG. 1.

Turning now to FIG. 6, there is illustrated electrical circuitry for detecting and indicating any contact of the insulation stripping blades with the wire which could result in nicks or other injury to the wire. The circuit shown comprises a pair of indicating lamps 79 and 81 which preferably are of different colors, red and green for example, so as to indicate by color whether it was the cut lead or the uncut lead which was contacted by an insulation stripping blade. The circuit to one of these indicator lights is completed whenever contact occurs between one of the insulation stripping blades 29 and the wire, as this completes electrical continuity through the stripping blade which made the contact, through the length of wire stock between that stripping blade and the wire cutter blades 27, and through these cutter blades which remain in electrical contact with the cut ends of the wire until completion of the inward stroke of the insulation stripping blades during which any injurious contact with the wire might occur.

Such contact would normally be only momentary, and contact is broken when the cut ends of the wire 25 are pulled away from the wire cutter blades 27 during the stripping operation. To output a less momentary and better visible indication to the operator, means preferably are provided for holding "on" whichever of the two warning lights was energized. As shown this is accomplished by two latching relays 83 and 85 each having its energizing coil connected in electrical parallel with one of the lights and having normally open contacts which close whenever the relay is energized to latch the relay and the respective indicating light 79 in "on" state. The indicator light then will remain lighted until the circuit is broken by the operator through reset switch 87.

As will be obvious, additional contacts could be provided in relays 83 and 85 to accomplish a control as well as an indicating function. Such additional contacts could be arranged to halt the operation of the wire cut and strip machine if desired, or reject mechanism could be provided and placed under control of the relay so as to eject the defective lead into a discard output.

As illustrated in FIG. 6, direct electrical connection need be provided to only one of the two wire cutter blades 27. The blades are electrically conductive, being of metal, and when stroking together they remain in good mechanical and electrical contact with each other. In the interests of still greater reliability of electrical connection to the blades a separate connection to each blade could of course be provided. Similarly, each of the wire guide blades 31 is normally in sliding mechanical and electrical contact with the insulation stripping blade 29 of the opposed blade assembly, as well as with the insulation stripping blade with which it is juxtaposed in the same assembly, so normally only one of the two electrical leads shown connecting to the two opposed blade assemblies actually is required.

Depending upon such factors as wire tolerances and the precision of dimensioning, mounting and positioning of the insulation stripping blades, the wire guide blades 31 may be entirely omitted and the wire guide and centering devices 63, 65 and 67 (FIG. 1) relied upon to provide adequate centering of the wire as it passes through the cutting and stripping blade areas. Alternatively, the insulation stripping and wire guide blades could be combined into a single unitary blade, the working edge of which is given a contour combining a bevel edge entry portion as at 75 in FIG. 4 with an insulation scoring or cutting surface as shown in FIG. 5.

As will be apparent from the foregoing description, provision of automatic nick detection in accordance with this invention requires only very minor modification of the structure of conventional wire cut and strip machines, the principal modification being the provision of an electrically insulated mounting for the insulation stripping blades, and the required associated electrical circuitry as shown in FIG. 6 is simple and inexpensive. In practice automatic nick detection thus implemented has been found to provide good reliability of nick detection and thus to provide effectively 100percent inspection of all stripped leads automatically and without operator attention except to the nick indication lights.

What is claimed as new and desired to be secured by Letters Patent of the United States is:

1. In combination in apparatus for cutting insulated electrical wire to desired length and stripping insulation from the cut ends,
   a. a pair of cutter head assemblies each comprising a wire cutter blade and at least one insulation stripping blade and means mounting said blades in electrically insulated and mechanically assembled relation;
   b. means mounting said cutter head assemblies in opposed relation and including actuator means for stroking them together so as to cause said wire cutter blades to sever the wire between them and to cause said insulation stripping blades to score the wire insulation to enable stripping thereof from the wire;
   c. and electrical circuit means for detecting contact between the wire and said insulation stripping blade potentially injurious to the wire, said circuit means including therein said insulation stripping blade, said wire cutter blade, the length of wire between said insulation stripping blade and said wire cutter blade, and means for detecting electrical continuity through the circuit when completed by contact of the insulation stripping blade with the wire.

2. Apparatus as defined in claim 1 wherein each of said cutter head assemblies further includes a wire blade mounted in juxtaposed relation with said wire stripping blade and having a beveled entry edge assuring centering of the wire as said cutter head assemblies are stroked together.

3. In combination in apparatus for cutting insulated electrical wire to desired length and stripping insulation from the cut ends,
   a. a cutter head assembly comprising a wire cutter blade, first and second insulation stripping blades, and means mounting said blades in electrically insulated and mechanically assembled relation with said stripping blades spaced to either side of said cutter blade a distance equal to the desired stripped length of wire;
   b. first electrical circuit means including therein said first insulation stripping blade, said wire cutter blade, the length of wire between said first stripping blade and said cutter blade, and means for detecting electrically continuity in the circuit thus constituted when continuity is established by contact of said first stripping blade with the wire;
   c. and second electrical circuit means including therein said second insulation stripping blade, said wire cutter blade, the length of wire between said second stripping blade and said cutter blade, and means for detecting electrical continuity in the circuit thus constituted when continuity is established by contact of said second stripping blade with the wire.

* * * * *

PO-1050
(5/69)

UNITED STATES PATENT OFFICE
CERTIFICATE OF CORRECTION

Patent No. 3,645,156                          Dated February 29, 1972

Inventor(s) Heinrich F. Meyer; Edward L. Minchow

It is certified that error appears in the above-identified patent and that said Letters Patent are hereby corrected as shown below:

Column 4, line 72, after "wire" insert --guide--. Column 6, line 1, change "electrically" to --electrical--.

Signed and sealed this 29th day of May 1973.

(SEAL)
Attest:

EDWARD M. FLETCHER, JR.          ROBERT GOTTSCHALK
Attesting Officer                 Commissioner of Patents